United States Patent
Stein

[11] Patent Number: 5,906,893
[45] Date of Patent: May 25, 1999

[54] SPRAYABLE, ADDITION CURABLE SILICONE FOUL RELEASE COATINGS AND ARTICLES COATED THEREWITH

[75] Inventor: Judith Stein, Schenectady, N.Y.

[73] Assignee: General Electric Company, Schenectady, N.Y.

[21] Appl. No.: 08/837,882

[22] Filed: Apr. 25, 1997

[51] Int. Cl.$^6$ .................................................. B32B 9/04
[52] U.S. Cl. ......................... 428/447; 428/450; 525/478; 525/479; 528/15; 528/31; 528/32
[58] Field of Search ..................... 525/478, 479; 528/15, 31, 32; 428/447, 450

[56] References Cited

U.S. PATENT DOCUMENTS

| | | | |
|---|---|---|---|
| 4,427,801 | 1/1984 | Sweet | 523/212 |
| 4,698,386 | 10/1987 | Fujimoto | 528/31 |
| 4,861,670 | 8/1989 | Lampe et al. | 428/447 |
| 5,391,590 | 2/1995 | Gerace et al. | 528/31 |
| 5,468,477 | 11/1995 | Kumar et al. | 528/28 |
| 5,792,723 | 8/1998 | Ikeno et al. | 502/158 |

FOREIGN PATENT DOCUMENTS

| | | |
|---|---|---|
| 320716A2 | 6/1989 | European Pat. Off. . |
| 646672A1 | 4/1995 | European Pat. Off. . |

*Primary Examiner*—Randy Gulakowski
*Attorney, Agent, or Firm*—Noreen C. Johnson; Douglas E. Stoner

[57] ABSTRACT

Sprayable, environmentally harmless addition curable silicone foul release coating compositions comprise a polyorganosiloxane having at least two organic radicals bound to silicon which have therein a carbon-carbon double bond, a polyorganosiloxane having at least two Si—H moieties per molecule, silica having a surface area in the range of about 100–600 m$^2$/g, a platinum group hydrosilylation catalyst and a polymerization inhibitor. One of the polyorganosiloxane components comprises internally functional and terminally functional compounds.

11 Claims, No Drawings

SPRAYABLE, ADDITION CURABLE SILICONE FOUL RELEASE COATINGS AND ARTICLES COATED THEREWITH

This invention was made with government support under Contract No. N61533-93-C-0062 awarded by the Department of the Navy. The government has certain rights in this invention.

BACKGROUND OF THE INVENTION

This invention relates to foul release coatings and articles coated therewith. More particularly, it relates to sprayable foul release coatings which may be employed without undue environmental harm.

As poetically stated in U.S. Pat. No. 4,861,670, "Marine fouling due to pernicious and pestiferous sessile organisms is a problem which reaches from ancient times to the present." In more simple terms, a perennial major aggravation to shippers and users of marine equipment in contact with water is the tendency of such equipment to become encrusted with various varieties of wildlife, as illustrated by barnacles and zebra mussels.

Said patent goes on to describe in considerable detail the types of treatments that have been employed, starting as early as 1854, to minimize marine fouling. Treatment materials have included compounds of such metals as copper, tin, arsenic, mercury, zinc, lead, antimony, silver and iron, as well as toxic organic materials such as strychnine and atropine. With increasing interest in the state of the environment, the use of such materials has been strongly discouraged.

More recently, polyorganosiloxanes (hereinafter sometimes designated "silicones" for brevity) have been found useful as anti-fouling coatings. They include condensation cured silicones, which, however, are sometimes considered undesirable since a frequent constituent thereof is a catalyst containing tin, and tin in various states is believed to have undesirable effects on aquatic life. Interest has turned to some extent, therefore, to the use of addition curable silicones, which are typically cured by the action of platinum-containing catalysts in very small proportions.

The aforementioned U.S. Pat. No. 4,861,670 discloses a suitable addition curable silicone coating material which may be employed for foul release in marine environments. It comprises a vinyl chain-stopped polysiloxane in combination with a non-reinforcing filler, a platinum catalyst, an organohydrogen polysiloxane and, as a reinforcing material, an organopolysiloxane copolymer comprising units generally described by the formulas $R_3SiO-$ and $Si(O-)_4$. Such units are conventionally and hereinafter sometimes designated M and Q units, as abbreviations for "mono" and "quater" representing the number of Si—O moieties therein, and such a copolymer is correspondingly designated an MQ resin. By the same rationale, $R_2Si(O-)_2$ and $RSi(O-)_3$ units are respectively designated D and T for "di" and "tri".

The MQ organopolysiloxane employed in the patented compositions functions as a reinforcing filler material. At the same time, however, its rheology is such that the coating composition in which it is incorporated is thixotropic and thus incapable as prepared of application by spraying. As disclosed in said patent, such compositions can only be conveniently applied neat by such time-honored but tedious methods as brushing or roller coating. The only potential way to make such materials sprayable is to dilute them with solvents, typically volatile organic compounds such as hydrocarbons which present their own environmental hazards. In any event, many localities have enacted legislation limiting the proportions of volatile organic compounds in such compositions to values in the parts-per-million range, far below those that would be necessary for them to serve as solvents.

Thus, the development of sprayable, environmentally harmless addition curable silicone foul release coating compositions remains a major concern.

SUMMARY OF THE INVENTION

The present invention includes addition curable compositions which serve as excellent foul release coatings with applied to marine structures such as the hulls of ships. Said compositions, while free from volatile organic compounds, may be applied by spraying. They are also free from environmentally destructive metals and toxic organic compounds.

In one of its aspects, the invention is directed to sprayable, addition curable coating compositions comprising the following and any reaction products thereof:

(A) at least one polyorganosiloxane comprising, per molecule, an average of at least two organic radicals bound to silicon which have therein a carbon-carbon double bond;

(B) at least one polyorganosiloxane comprising an average of at least two Si—H moieties per molecule, in an amount such that the ratio of equivalents of component B to component A is in the range of about 1.1–1.6:1;

(C) about 15–30 parts by weight, per 100 parts of component A, of suspended silica having a surface area in the range of about 100–600 $m^2/g$;

(D) a catalytically effective proportion of a platinum group hydrosilylation catalyst; and (E) an amount effective to provide storage stability of at least one polymerization inhibitor;

with the proviso that either component A or component B comprises at least one internally functional polyorganosiloxane in which said functional groups incorporate internal silicon atoms, the ratio of equivalents of said internally functional polyorganosiloxane to total polyorganosiloxanes in said component A or component B being in the range of about 0.3–0.7:1; the other of component A or component B comprising only terminally functional polyorganosiloxanes.

Another aspect of the invention is articles comprising a marine structure coated with an anti-fouling coating which is the addition cured reaction product of the composition defined hereinabove.

DETAILED DESCRIPTION

Preferred Embodiments

The compositions of this invention include curable compositions, which typically comprise components A, B, C, D and E in their unreacted form. They also comprise intermediate reaction stages of said components and their final cured reaction product. The word "component" is used herein to define both materials which undergo chemical reaction and materials which remain in their original form during the occurrence of chemical reactions.

Component A is at least one polyorganosiloxane (silicone) comprising, per molecule, an average of at least two organic radicals bound to silicon which have therein a carbon-carbon double bond, said radicals sometimes simply designated "unsaturated" hereinafter for brevity. The presence of at least two of such radicals is necessary to afford the desired degrees of chain extension and crosslinking, as noted hereinafter.

For the most part, these silicones are polydiorganosiloxanes which typically have the formula

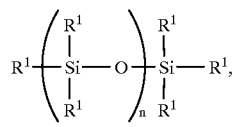

(I)

wherein each $R^1$ is independently a hydrocarbon or fluorinated hydrocarbon radical, at least two $R^1$ radicals per molecule being unsaturated, and n has an average value in the range of about 10–1,500. Illustrative hydrocarbon radicals are $C_{1-20}$ alkyl, $C_{6-20}$ aryl and alkaryl, vinyl, isopropenyl, allyl, butenyl and hexenyl. An illustrative fluorinated hydrocarbon radical is 3,3,3-trifluoropropyl.

Most often, each $R^1$ radical is independently methyl or vinyl, whereupon component A is a vinyl-substituted polydimethylsiloxane. The preferred number average molecular weight range for component A (all molecular weights herein being as determined by proton nuclear magnetic resonance spectroscopy) is in the range of about 6,000–80,000, corresponding to a value of n in the range of about 80–1,100.

Component B, sometimes hereinafter designated "hydride silicone", is similar in molecular structure to component A except that it contains Si—H moieties rather than ethylenically unsaturated groups. It is typically a polydiorganosiloxane of the formula

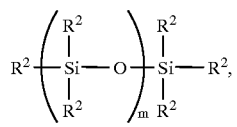

(II)

wherein each $R^2$ is independently a hydrocarbon or fluorinated hydrocarbon radical as defined hereinabove or hydrogen, at least two $R^2$ radicals per molecule being hydrogen, and m has an average value in the range of about 10–1,500. Cyclic polydiorganosiloxanes analogous to those of formula II may also be employed. In a manner analogous to component A, component B is preferably a hydrogen polydimethylsiloxane.

The preferred number average molecular weight range for component B is in the range of about 1,000–28,000, corresponding to a value of m in the range of about 13–380.

An important feature of the compositions of the invention is the presence of silicone molecules which serve the functions of both crosslinking and chain extension as the addition curing reaction takes place. Chain extension is provided by the employment of molecules in either component A or component B which contain terminally functional groups. That is, the $R^1$ or $R^2$ groups therein which are bound to terminal silicon atoms in the silicone chain are polymerizable ethylenically unsaturated radicals (e.g., vinyl) or hydrogen atoms, respectively. Said terminally functional groups are preferably the only functional groups in the molecule. Crosslinking is provided by the employment of molecules with internally functional groups; i.e., unsaturated radicals or hydrogen bound to non-terminal silicon atoms.

It is thus possible, for example, to employ two species as component A, one having terminal and the other both terminal and internal unsaturated groups, in combination with one species which is hydride-terminated as component B. Alternatively, and preferably since the resulting compositions tend to have particularly short curing times, a single vinyl-terminated species may be employed as component A with two species as component B, one hydride terminated and the other containing both terminal and internal hydride atoms.

For the purposes of the invention, the ratio of equivalents in either component A or component B of internally functional silicone to total silicone is in the range of about 0.3–0.7:1 and preferably about 0.45–0.55:1. Most preferably, equal numbers of equivalents of both types of silicones are employed.

Component C is silica ($SiO_2$) which is suspended in the curable composition. Said silica has a surface area in the range of about 100–600 and preferably about 200–400 $m^2$/g. Any type of silica having a surface area, as manufactured, within this range is acceptable. Fumed silica is preferred.

It is preferred that the silica be treated to increase its hydrophobic properties. Suitable treatment agents are known to those skilled in the art and include such silicon compounds as cyclooctamethyltetrasiloxane and hexamethyldisilazane.

Component D is a platinum group hydrosilylation catalyst. By "platinum group" is meant the portion of Group VIII of the periodic table, as traditionally identified, containing the metals rhodium, ruthenium, palladium, osmium, iridium and platinum. The preferred metals from this group are rhodium, palladium and platinum, with platinum-containing catalysts being particularly preferred because of their relative availability and particular suitability.

Numerous types of platinum hydrosilylation catalysts are known in the art; examples are disclosed in U.S. Pat. Nos. 3,775,452, 4,418,157, 4,851,452 and 5,011,865, the disclosures of which are incorporated by reference herein. They include, for example, reaction products of chloroplatinic acid with olefins, alcohols, ethers, aldehydes and vinylsiloxanes such as tetramethyldivinyldisiloxane. A reaction product of chloroplatinic acid with tetramethyldivinyldisiloxane in the presence of sodium bicarbonate as disclosed in the aforementioned U.S. Pat. No. 3,775,452, dissolved in xylene to a level of about 5% by weight platinum, sometimes designated "Karstedt's catalyst", is often preferred.

Component E is a polymerization inhibitor, which is necessary in the compositions of the invention to prevent spontaneous addition polymerization during storage. Suitable inhibitors are known in the art and include acetylenic alcohols, vinyl-substituted silicones and stable free radicals. An example of a suitable vinyl-substituted silicone is tetramethyltetravinylcyclotetrasiloxane.

The compositions of this invention may contain other conventional materials, provided the presence of such materials does not render the composition too viscous to be sprayable. For the purposes of the invention, a composition is considered sprayable if its viscosity is no greater than about 10,000 centipoise under ambient temperature and pressure conditions.

Turning now to the proportions of the constituents of the compositions of this invention, the ratio of equivalents of component B to component A is in the range of about 1.1–1.6:1. As used herein, the equivalent weights of components A and B are considered to be their number average molecular weights divided by the average number of ethylenically unsaturated groups and Si—H groups per molecule, respectively, therein.

Component C is present in the amount of about 15–30 parts by weight per 100 parts of component A. Component D is present in a catalytically effective amount, typically about 5–20 ppm by weight of platinum based on component A. Component E is present in an amount effective to promote storage stability, most often about 200–1,000 ppm by weight based on component A.

The compositions of the invention may be prepared by merely mixing the various components in a single batch. It is generally more convenient, however, to initially prepare a masterbatch in which component C is intimately blended with component A or a portion thereof, said masterbatch typically containing about 10–30% by weight of component C. Subsequently, said masterbatch may be blended with the remaining components to product the final addition curable composition.

The marine structures in the articles of the invention are often ships' hulls. However, other underwater articles such as liquid collecting and discharge pipes, dry dock equipment and the like are included. Suitable materials therefor include metals such as iron and aluminum and resinous materials such as fiber-reinforced thermoplastic or thermoset resins.

The articles of the invention are typically produced prior to their immersion in water for use. It may be advantageous initially to prepare the surface of the article to be coated, typically by sand blasting, and/or to apply directly to said surface a layer of a primer composition such as an acrylic resin or a silicate ester, optionally containing an adhesion promoter such as 3-aminopropyltrimethoxysilane. The primer material is allowed to cure, after which the composition of the invention is applied, typically by spraying. Following application, the composition is allowed to cure, which typically occurs upon standing overnight under ambient conditions. Illustrative thicknesses of the coating of the composition of the invention are in the range of about 10–10,000 microns.

The invention is illustrated by an example in which a masterbatch comprising 20% (all parts and percentages hereinafter being by weight) fumed silica, pretreated with cyclooctamethyltetrasiloxane and hexamethyldisilazane, and 80% vinyl-terminated polydimethylsiloxane having a viscosity of 250 centipoise was prepared in a double planetary mixer. The silica was added in several batches to half the silicone with mixing after each addition, and the remaining silicone was then blended in to form the masterbatch.

A composition was then prepared from 80 parts of the masterbatch, 5.06 parts (total 16.8 meq) of further vinyl-terminated polydimethylsiloxane, 10 ppm (based in vinyl-terminated polydimethylsiloxane) platinum in the form of a platinum-tetramethyldivinylsiloxane complex containing 5.93% platinum, 0.040 part of tetramethyltetravinylcyclotetrasiloxane, 1.098 parts (10.8 meq) of a hydride silicone having an equivalent weight of 102 and 13.52 parts (10.8 meq) of a terminal hydride silicone having an equivalent weight of 1,257. The resulting composition of the invention contained per 100 parts of component A, 21.2 parts of component B, 23.2 parts of component C, 10 ppm of platinum and 579 ppm of inhibitor.

Upon curing the composition overnight at 80° C., a cured material having a Shore A hardness of 40, a tensile strength of 23,017 kPa and a strain of 237% was obtained. These properties are essentially equivalent to those obtained from a commercially available condensation cured foul release coating composition.

Sand-blasted aluminum panels were coated with a commercially available primer and then, by spraying, with the above-described composition which was then cured overnight at room temperature. Upon exposure to salt water for two years, it was found that 89% of the coated surface was unfouled by marine organisms.

What is claimed is:

1. An article comprising a marine structure coated with an anti-fouling coating which is the addition cured reaction product of a composition comprising:
   (A) at least one polyorganosiloxane comprising, per molecule, an average of at least two organic radicals bound to silicon which have therein a carbon-carbon double bond;
   (B) at least one polyorganosiloxane comprising an average of at least two Si—H moieties per molecule, in an amount such that the ratio of equivalents of component B to component A is in the range of about 1.1–1.6:1;
   (C) about 15–30 parts by weight, per 100 parts of component A, of suspended silica having a surface area in the range of about 100–600 m²/g;
   (D) a catalytically effective proportion of a platinum group hydrosilylation catalyst; and
   (E) an amount effective to provide storage stability of at least one polymerization inhibitor;
   with the proviso that either component A or component B comprises at least one internally functional polyorganosiloxane containing functional groups which incorporate internal silicon atoms, the ratio of equivalents of said internally functional polyorganosiloxane to total polyorganosiloxanes in said component A or component B being in the range of about 0.3–0.7:1; the other of component A or component B comprising only terminally functional polyorganosiloxanes.

2. An article according to claim 1 wherein the marine structure is a ship's hull.

3. An article according to claim 1 which comprises a layer of a primer composition on said surface, followed by said anti-fouling coating.

4. An article according to claim 1 wherein said marine structure is of iron, aluminum or a fiber-reinforced thermoplastic or thermoset resin.

5. An article according to claim 4 wherein component A has the formula

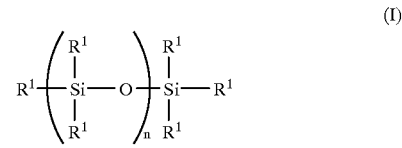

(I)

and component B has the formula

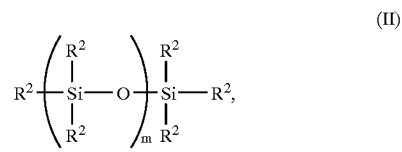

(II)

wherein each $R^1$ is independently a hydrocarbon or fluorinated hydrocarbon radical, at least two $R^1$ radicals per molecule having therein a carbon-carbon double bond; each $R^2$ is independently a hydrocarbon or fluorinated hydrocarbon radical, at least two $R^2$ radicals per molecule being hydrogen; and each of m and n has an average value in the range of about 10–1,000.

6. An article according to claim 5 wherein component A is a vinyl-substituted polydimethylsiloxane and component B is a polydimethylsiloxane containing Si—H moieties.

7. An article according to claim 6 wherein the ratio of equivalents of internally functional polyorganosiloxane to total polyorganosiloxane in component A or B is in the range of about 0.3–0.7:1.

8. An article according to claim 6 wherein component B comprises internally and terminally functional polydimethylsiloxanes.

9. An article according to claim 5 wherein component C is fumed silica.

10. An article according to claim 5 wherein component D is a platinum-containing catalyst.

11. An article according to claim 5 wherein component E is an acetylenic alcohol, vinyl-substituted cyclic polyorganosiloxane or stable free radical.

* * * * *